United States Patent
Woodling

[15] 3,642,293
[45] Feb. 15, 1972

[54] ROTARY SHAFT FLUID SEAL FOR HIGH PRESSURE

[72] Inventor: George V. Woodling, 22077 West Lake Road, Rocky River, Ohio 44116

[22] Filed: July 27, 1970
[21] Appl. No.: 58,215

[52] U.S. Cl. .................................................. 277/206 A
[51] Int. Cl. .......................................................... F16j 15/32
[58] Field of Search ........................ 277/206 A, 206, DIG. 6

[56] References Cited

UNITED STATES PATENTS 2,983,533   5/1961   Tisch .................................... 277/206.1
3,550,990   12/1970   Rentschler ........................... 277/206.1

OTHER PUBLICATIONS

Rubber O-ring Seals, Product Engineering June 1951, by E. L. Carlotta page 131

*Primary Examiner*—Robert I. Smith
*Attorney*—Woodling, Krost, Granger and Rust

[57] ABSTRACT

Rotary shaft seal means for effecting a fluid seal between a shaft and wall means defining a space extending outwardly of said shaft and disposed to receive said seal means. Said seal means is subject to fluid compaction and comprises an O-ring of rubberlike material having an annular crown portion sealingly engaging said shaft. Fluid blanking means seals off a portion of said O-ring which would otherwise be exposed to fluid pressure to reduce the fluid compaction of said O-ring at said crown portion.

6 Claims, 4 Drawing Figures

PATENTED FEB 15 1972　　　　　　　　3,642,293

INVENTOR
GEORGE V. WOODLING
BY
Woodling, Krost, Granger and Rust,
attys.

3,642,293

ROTARY SHAFT FLUID SEAL FOR HIGH PRESSURE

BACKGROUND OF THE INVENTION

Most elastomers, such as rubberlike O-rings, when heated in a stretched or stressed (garterlike) condition, will contract. The contraction (shrinkage) is damaging because it results in a tendency for the O-ring to squeeze all the harder against the rotating shaft, which self-perpetuates more heat. Continued rotation of the shaft tends to cause the O-ring to seize the shaft, whereupon more friction will cause more heat and the process becomes self-perpetuating until the O-ring is destroyed. This phenomenon is known as the Gow-Joule effect.

Generated heat is also a function of the speed and the pressure compaction of the O-ring about the shaft which results in a widening of the axial contact engagement of the O-ring with the shaft. If the effect of the pressure compaction is reduced, then the speed may be increased. Also, a reduction in the pressure compaction tends to delay the initiation of the Gow-Joule effect.

Accordingly, it is an object of my invention to reduce the pressure compaction of the O-ring about the shaft.

Another object is to reduce the force that tends to compact the O-ring about the shaft.

Another object is to provide opposing forces within the O-ring to reduce the pressure compaction of the O-ring about the shaft.

Another object is to provide a narrow axial contact engagement between the O-ring and the shaft.

Another object is to maintain a narrow axial contact engagement even under conditions of high fluid pressures.

Another object is to provide for low-pressure compaction of the O-ring about the shaft, even under conditions of high fluid pressures.

Another object is to provide for sealing off a portion of the O-ring, which would otherwise be exposed to fluid pressure, to reduce the compaction of the O-ring about the shaft.

Another object is to provide for operating the O-ring under a situation which is about the same as it would be for low-pressure operation, even though the O-ring is exposed to high pressure.

Another object is to provide a relationship between the configuration of the O-ring and the configuration of the gland whereby a portion of the O-ring, which would otherwise be exposed to fluid pressure, is sealed off to give a low-pressure operating condition to the O-ring, even though the pressure is high.

Another object is the provision of a shaft seal wherein the fluid pressure tends to reduce the axial contact engagement of the O-ring with the shaft, instead of enlarging it.

Another object is to reduce the damaging effect on the O-ring which high fluid pressure would otherwise tend to cause.

Another object is the provision of an O-ring shaft seal wherein the fluid pressure tends to prevent extrusion instead of inducing it.

Another object is the provision of an O-ring shaft seal which will withstand high fluid pressures.

Another object is to reduce the phenomenon, known as the Gow-Joule effect.

Another object is the provision of a shaft seal having a large radial cushion-effect and a small circumferential frictional contact with the shaft.

Another object is the provision of a shaft seal which makes it unnecessary to maintain close manufacturing tolerance in mounting the seal.

Another object of my invention is the provision of a shaft seal including an O-ring having first and second end sections, wherein one of said end sections constitutes a sealing section and the other of said end sections constitutes a nonsealing section.

Another object is the provision of a shaft seal in which the nonsealing section is exposed to fluid pressure whereby said fluid pressure may act outwardly upon said nonsealing section and thereby tend to urge said sealing section outwardly of said shaft.

Another object is to subject said sealing section to both a cross-sectional compression and a circumferential compression.

Another object is to mount the nonsealing section about the shaft with a clearance space therearound.

Another object is to prevent extrusion of the O-ring along the shaft without the use of backup washers.

Another object is the provision of a groove whereby a square type of O-ring with a hardness value of at least substantially 80 Durometer may be inserted therein without difficulty and still circumferentially compress at least one end section of the O-ring.

SUMMARY OF THE INVENTION

My invention constitutes rotary shaft seal means for effecting a fluid seal between a shaft and wall means defining a space extending outwardly of said shaft and disposed to receive said seal means, said seal means being subject to fluid compaction and comprising an O-ring of rubberlike material having an annular crown portion sealingly engaging said shaft, and fluid blanking means for sealing off a portion of said O-ring which would otherwise be exposed to fluid pressure to reduce the fluid compaction of said O-ring at said crown portion.

BRIEF DESCRIPTION OF THE DRAWINGS

Other objects and a fuller understanding of this invention may be had by referring to the following description and claims, taken in conjunction with the accompanying drawings, in which:

DESCRIPTION OF THE PREFERRED EMBODIMENT

Figure 1:
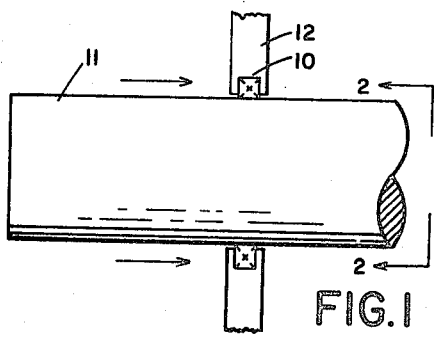
FIG. 1 is a view, diagrammatically illustrating the position in which my shaft seal may be mounted between a shaft and a surrounding body.
Figure 2:
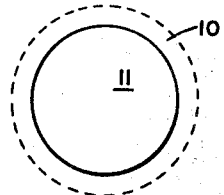
FIG. 2 is an end view of the shaft seal only, looking in the direction of the line 2—2.
Figure 3:
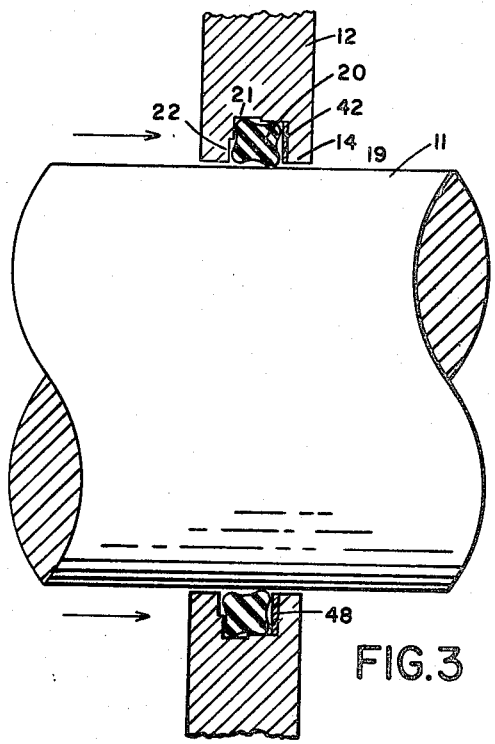
FIG. 3 is an enlarged diametrical, cross-sectional view of my shaft seal, drawn to substantially three-times scale for a 1-inch shaft.

With reference to the drawings, my shaft seal is illustrated by the reference character 10 and is adapted to effect a fluid seal between a shaft 11 and a surrounding body 12, which may comprise a flange or wall of a fluid pressure device. The shaft seal is responsive to fluid, under pressure in the fluid pressure device, and the direction at which the pressure is applied against the shaft seal is indicated by the arrows in FIGS. 1 and 3. As seen best in FIG. 4, the surrounding body 12 has a shaft bore 14 through which the shaft 11 extends. The shaft bore 14 is larger in diameter than the shaft to provide a diametrical clearance 19 therebetween which may reside (depending upon the fluid pressure) in a range from approximately 0.008 to 0.012 inch.

Figure 4:
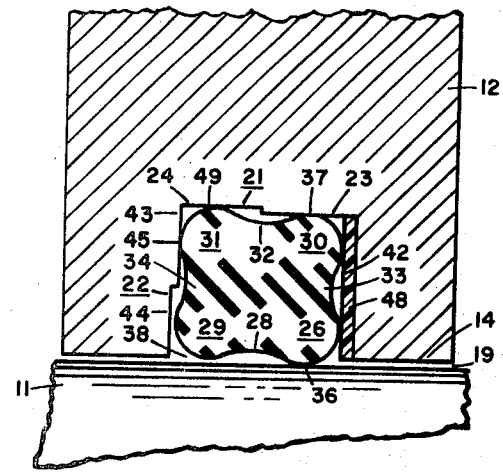
FIG. 4 is an enlarged fragmentary view of FIG. 3, showing the relationship of the O-ring with respect to the shaft and groove.

The shaft seal is subject to fluid compaction and comprises an O-ring 20 having substantially a quadrilateral or square cross section and is adapted to be mounted in a space extending outwardly of the shaft. The space is defined by wall means which include at least bottom wall means 21, upstream sidewall means 22 and downstream sidewall means 42 which may comprise a backup washer 48, as shown in FIG. 4. The bottom wall means has first and second bottom wall portion means 23 and 24. The first bottom wall portion means 23 defines with said shaft 11 a first perpendicular depth and the second bottom wall portion means 24 defines with said shaft 11 a second perpendicular depth which is greater than said first perpendicular depth by an amount preferably in the neighborhood of approximately 0.013 inch.

The upstream sidewall means 22 has first and second sidewall portion means 43 and 44. The first sidewall portion means 43 faces and defines with said downstream sidewall means 42 a first axial distance and the second sidewall portion means 44 faces and defines with said downstream sidewall means 42 a second axial distance. The first axial distance is less than said second axial distance.

The O-ring 20 is preferably composed of rubberlike material and has an internal annular surface confronting the shaft 11 and an external annular surface confronting the bottom wall means. The internal annular surface is provided with first and second raised crown corners 26 and 29 with an internal valley portion 28 therebetween. The external annular surface is provided with third and fourth raised crown corners 30 and 31 with an external valley portion 32 therebetween. The O-ring defines a first end section 33 between the first and third crown corners and a second end section 34 between the second and fourth crown corners. For a 1-inch shaft, the internal free-state diameter of the first and second crown corners 26 and 29 is preferably in the neighborhood of approximately 1.049 inches. For other size shafts, substantially the same oversize relation holds true. The first end section 33 constitutes a sealing section and has a free-state cross-sectional dimension between the first and third crown corners 26 and 30 greater than the first perpendicular depth by an amount which is preferably in the neighborhood of approximately 0.005 inch. Thus, the first end section 33 is under a state of cross-sectional compression of approximately 0.005 inch. The first crown corner 26 directly confronts and engages the shaft 11 and defines therewith a fluid seal at 36 and the third crown corner 30 directly confronts and engages the first bottom wall portion means 23 and defines therewith a fluid seal at 37. The first crown corner 26 may be designated as a shaft sealing crown corner.

The second end section 34 constitutes a nonsealing section. Preferably, the free-state external diameter of the fourth crown corner 31 is substantially the same as the diameter of the second bottom wall portion means 24, which means that the nonsealing section is substantially uncompressed, both cross-sectionally and circumferentially. Since the nonsealing section is uncompressed, the internal diameter of the second crown corner 29 remains in substantially a free-state which, as previously mentioned, is in the neighborhood of approximately 1.049 inches for a 1-inch shaft. Thus, the second crown corner 29 directly confronts the shaft and provides a nonsealing clearance therearound of approximately 0.049/2$\pi$ inch, or about 0.008 inch. The nonsealing clearance is identified by the reference character 38. The second crown corner 29 constitutes a nonsealing crown corner.

The first end section 33 faces the downstream sidewall means 42 and the second end portion 34 faces the upstream sidewall means 22. The free-state axial dimension of the O-ring between the third and fourth crown corners 30 and 31 is greater than the first axial distance by an amount which is preferably in the neighborhood of approximately 0.005 inch. Thus, the O-ring between the third and fourth crown corners 30 and 31 is under a state of axial compression of approximately 0.005 inch. The fourth crown corner 31 directly confronts and engages the first sidewall portion means 43 and defines therewith a fluid seal at 45. The axial free-state dimension of the O-ring between the first and second crown corners 26 and 29 is less than the second axial distance, whereby said second crown corner 29 directly confronts and is axially spaced from said second sidewall portion means 44. Accordingly the internal surface of the second crown corner 29 and the internal valley portion 28 is exposed to fluid pressure whereby the fluid pressure may act outwardly upon said second crown corner 29 and upon the internal valley portion 28 and thereby tend to urge the first crown corner 26 in a direction outwardly of the shaft. The fluid seal at 45, in the first instance, guards against the fluid from escaping around the crown corner 31 and from acting upon the external annular surface of the O-ring before it acts upon the internal annular surface. Once the fluid acts upon the internal annular surface of the O-ring, the external annular surface is sealed off from fluid pressure at 49 where the crown corner 31 engages the second bottom wall portion means 24. The fluid seal at 49 is responsive to fluid pressure and continues to act to seal off the fluid pressure, even though the seal at 45 may become broken. The fluid pressure, in acting upon the end face of the O-ring between the second and fourth crown corners 29 and 31, tends to compress or compact the O-ring axially toward the downstream sidewall means 42. This axial compaction of the O-ring would normally tend to produce a large inward component force for radially pressing the first crown corner 26 tighter against the shaft at 36 which may become damaging if it is pressed too hard. With my invention, it cannot be pressed too hard because the fluid pressure at the same time is acting upon the internal surface of the crown corner 29 and the internal valley portion 28 to produce an outward urging force for urging the crown corner 26 outwardly of the shaft. This outward urging force tends to oppose the inward component force and as a result the crown corner 26 is not pressed against the shaft too hard as would normally be the case. My shaft seal may thus withstand extra high fluid pressures without damage. The crown corner 26 is prevented from being totally lifted away from the shaft because with my seal the outward urging force is less than the inward component force because the area of the O-ring against which the fluid acts to produce the outward urging force is less than the area against which the fluid acts to produce the inward component force. Since the crown corner 26 is protected from excessive pressures against the shaft, there is less tendency for the crown corner 26 to extrude along the shaft. However, the backup washer 48 may be used for extra precautions.

Under high-pressure operation, the crown sealing corner 26 functions under a condition which is about the same as it would be for low-pressure operation. The axial contact engagement of the crown sealing corner 26 is not excessively enlarged but remains about the same. The total result is that the compaction of the crown sealing corner 26 is greatly reduced from what it would have been otherwise, whereby the O-ring is protected from being damaged.

For a rotating shaft seal, experience teaches that it is desirable to keep the area of the axial contact which the O-ring makes with the shaft as small as possible to reduce friction and the resultant heat generated. For a given amount of cross-sectional compression, the area of the axial contact is a function of the radius of curvature of the O-ring where it engages the shaft. The square-section type of O-ring has the property of providing a small radius of curvature in contact with the shaft and at the same time of providing a thick radial dimension between opposing crown portions to give a cushion effect. The larger the radial thickness, the less the requirement of accurate machining of the depth of the O-ring groove, because some of the machine tolerance has an opportunity of being absorbed (cushion effect) before it reaches the shaft. The radial or free-state cross-sectional dimension of the O-ring between opposing crown portion is more than twice the radius of curvature of a crown portion where it engages the shaft. The O-ring preferably has a hardness value of at least substantially 80 Durometer. During mounting, since the end section 33 only is compressed, the O-ring with a hardness value of at least substantially 80 Durometer may be readily inserted into the groove, whereas, if both end sections were compressed during mounting, difficulty may be experienced.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Seal means for effecting a fluid seal between a shaft and wall means defining a space extending outwardly of said shaft and disposed to receive said seal means, said wall means including bottom wall means having first and second bottom wall portion means, said first bottom wall portion means defining with said shaft a first perpendicular depth, said second bottom wall portion means defining with said shaft a second perpendicular depth, said first perpendicular depth being less than said second perpendicular depth, said seal means comprising an O-ring of rubberlike material defining first and second end sections with each end section having a pair of crown corners, said pair of crown corners on said first end section constituting a sealing section, said pair of crown corners on said second end section constituting a nonsealing section, one of said crown corners on said first end section confronting and sealingly engaging said shaft and constituting a shaft sealing crown corner, one of said crown corners on said second end section confronting said shaft and constituting a nonsealing crown corner therewith, said nonsealing crown corner being exposed to fluid pressure whereby said fluid pressure may act outwardly on said second end section and thereby tend to urge said shaft sealing crown corner in a direction outwardly of said shaft.

2. The structure of claim 1, wherein said O-ring has substantially a quadrilateral cross section.

3. Seal means for effecting a fluid seal between a shaft and wall means defining a space extending outwardly of said shaft and disposed to receive said seal means, said wall means including bottom wall means having first and second bottom wall portion means, said first bottom wall portion means defining with said shaft a first perpendicular depth, said second bottom wall portion means defining with said shaft a second perpendicular depth, said first perpendicular depth being less than said second perpendicular depth, said seal means comprising an O-ring of rubberlike material having an internal annular surface confronting said shaft and provided with first and second raised crown portions spaced apart from each other and including an internal valley portion therebetween and having an external annular surface confronting said bottom wall means and provided with third and fourth raised crown portions spaced apart from each other and including an external valley portion therebetween, said O-ring defining a first end section between said first and third crown portions and a second end section between said second and fourth crown portions, said first end section constituting a sealing section and having a free-state cross-sectional dimension between said first and third crown portions greater than said first perpendicular depth whereby said first end section is under a state of cross-sectional compression, said first crown portion directly confronting and engaging said shaft and defining therewith a fluid seal, said second end section constituting a nonsealing section and having a free-state cross-sectional dimension between said second and fourth crown portions less than said second perpendicular depth, said second crown portion directly confronting said shaft and providing a nonsealing clearance therearound, said wall means also including downstream and upstream sidewall means, said first end section of said O-ring having end wall means facing said downstream sidewall means, said second end section of said O-ring having end wall means facing said upstream sidewall means, said second crown portion and said internal valley portion being exposed to fluid pressure whereby said fluid pressure may act outwardly upon said second crown portion and upon said internal valley portion and thereby tend to urge said first crown portion in a direction outwardly of said shaft.

4. The structure of claim 3, wherein said upstream sidewall means has first and second sidewall portion means, said first sidewall portion means facing and defining with said downstream sidewall means a first axial distance, said second sidewall portion means facing and defining with said downstream sidewall means a second axial distance, said first axial distance being less than said second axial distance, said O-ring having a free-state axial dimension between said third and fourth crown portions greater than said first axial distance whereby said third and fourth crown portions is under a state of axial compression.

5. The structure of claim 4, wherein said first and third crown portions respectively have free-state diameters greater than the diameters of said shaft and said first bottom wall portion means whereby said first end section of said O-ring between said shaft and said first bottom wall portion means is under a state of circumferential compression.

6. The structure of claim 3, wherein wall means includes backup washer means.

* * * * *